(12) United States Patent
Chang (10) Patent No.: US 12,316,151 B2
(45) Date of Patent: May 27, 2025

(54) ELECTRONIC DEVICE WITH ELECTROMAGNET

(71) Applicant: Advanced Semiconductor Engineering, Inc., Kaohsiung (TW)

(72) Inventor: Wei-Hao Chang, Kaohsiung (TW)

(73) Assignee: ADVANCED SEMICONDUCTOR ENGINEERING, INC., Kaohsiung (TW)

( * ) Notice: Subject to any disclaimer, the term of this patent is extended or adjusted under 35 U.S.C. 154(b) by 186 days.

(21) Appl. No.: 17/561,097

(22) Filed: Dec. 23, 2021

(65) Prior Publication Data

US 2023/0208175 A1    Jun. 29, 2023

(51) Int. Cl.
*H02J 7/00* (2006.01)
*H04R 1/10* (2006.01)

(52) U.S. Cl.
CPC ...... *H02J 7/00712* (2020.01); *H02J 7/00034* (2020.01); *H02J 7/0042* (2013.01); *H04R 1/1025* (2013.01)

(58) Field of Classification Search
CPC .............. H04R 1/1025; H04R 2225/31; H02J 7/00712; H02J 7/00034; H02J 7/0036; H02J 7/0034; H02J 7/0042; H02J 7/00043; H02J 7/00045; H02J 7/00047; H02J 7/0047
USPC .................................................. 381/74, 323
See application file for complete search history.

(56) References Cited

U.S. PATENT DOCUMENTS

| 4,379,988 | A * | 4/1983 | Mattatall | H02J 50/90 |
| | | | | 320/108 |
| 6,658,124 | B1 * | 12/2003 | Meadows | H04R 25/55 |
| | | | | 381/328 |
| 9,590,445 | B2 * | 3/2017 | Aerts | H02J 50/12 |
| 2015/0015079 | A1 * | 1/2015 | Ohta | H04B 5/79 |
| | | | | 307/104 |
| 2018/0084680 | A1 * | 3/2018 | Jarvis | H05K 1/148 |
| 2019/0348863 | A1 * | 11/2019 | De Masi | H02J 50/70 |
| 2020/0021127 | A1 * | 1/2020 | Itagaki | H04R 25/602 |
| 2023/0097239 | A1 * | 3/2023 | Vahle | H02J 50/10 |
| | | | | 320/108 |

FOREIGN PATENT DOCUMENTS

| CN | 107993820 A | * | 5/2018 | ............. H01F 27/30 |
| CN | 112135212 A | * | 12/2020 | ............... H04R 1/10 |
| WO | WO-2022225445 A1 | * | 10/2022 | ........... H01F 27/366 |

* cited by examiner

*Primary Examiner* — Ahmad F. Matar
*Assistant Examiner* — Sabrina Diaz
(74) *Attorney, Agent, or Firm* — FOLEY & LARDNER LLP (57) ABSTRACT

An electronic device package and a method for manufacturing the electronic device are provided. The electronic device includes a charging element, a housing covering the charging element and a sensing element electrically connected to the housing. The sensing element is configured to detect an external device and to drive the charging element.

7 Claims, 8 Drawing Sheets

ELECTRONIC DEVICE WITH ELECTROMAGNET

BACKGROUND

1. Field of the Disclosure

The instant disclosure relates to, amongst other things, an electronic device with an electromagnet. The electronic device includes a charging unit.

2. Description of Related Art

An electronic device, which includes an electromagnetic used for charging an external device, such as an earphone, a hearing aid, etc., should include a metal cover or a cover with a metal layer to cover the electromagnet, so that an electromagnetic field from the electromagnet could be blocked. Thus, an electronic component, such as an IR sensor, cannot be electrically connected to and mounted on the cover of the electronic device, and the electronic device should further include a FRC connector used for connecting the electronic component disposed on the cover.

SUMMARY

According to one example embodiment of the instant disclosure, an electronic device includes a charging element, a housing covering the charging element and a sensing element electrically connected to the housing. The sensing element is configured to detect an external device and to drive the charging element.

According to another example embodiment of the instant disclosure, an electronic device includes a first circuit structure, a second circuit structure above the first circuit structure, a charging element arranged between the first circuit structure and the second circuit structure, and a sensing element electrically connected to the second circuit structure and configured to detect an external device passing through the second circuit structure. The charging element is configured to electrically couple the external device.

According to another example embodiment of the instant disclosure, an electronic device includes a charging element and a housing covering the charging element. The charging element is configured to electrically couple to an external device which is put into the housing. Further, the housing is configured to provide shielding to the charging element and configured to electrically connect to a component mounted thereon.

In order to further understanding of the instant disclosure, the following embodiments are provided along with illustrations to facilitate appreciation of the instant disclosure; however, the appended drawings are merely provided for reference and illustration, and do not limit the scope of the instant disclosure.

BRIEF DESCRIPTION OF THE DRAWINGS

Aspects of some embodiments of the present disclosure are readily understood from the following detailed description when read with the accompanying figures. It is noted that various structures may not be drawn to scale, and dimensions of the various structures may be arbitrarily increased or reduced for clarity of discussion.

DETAILED DESCRIPTION

Common reference numerals are used throughout the drawings and the detailed description to indicate the same or similar components. Embodiments of the present disclosure will be readily understood from the following detailed description taken in conjunction with the accompanying drawings.

The following disclosure provides for many different embodiments, or examples, for implementing different features of the provided subject matter. Specific examples of components and arrangements are described below to explain certain aspects of the present disclosure. These are, of course, merely examples and are not intended to be limiting. For example, the formation of a first feature over or on a second feature in the description that follows may include embodiments in which the first and second features are formed or disposed in direct contact, and may also include embodiments in which additional features are formed or disposed between the first and second features, such that the first and second features are not in direct contact. In addition, the present disclosure may repeat reference numerals and/or letters in the various examples. This repetition is for the purpose of simplicity and clarity and does not in itself dictate a relationship between the various embodiments and/or configurations discussed.

As used herein, spatially relative terms, such as "beneath," "below," "above," "over," "on," "upper," "lower," "left," "right," "vertical," "horizontal," "side" and the like, may be used herein for ease of description to describe one element or feature's relationship to another element(s) or feature(s) as illustrated in the Figures. The spatially relative terms are intended to encompass different orientations of the device in use or operation in addition to the orientation depicted in the Figures. The device may be otherwise oriented (rotated 90 degrees or at other orientations) and the spatially relative descriptors used herein may likewise be interpreted accordingly. It should be understood that when an element is referred to as being "connected to" or "coupled to" another element, it may be directly connected to or coupled to the other element, or intervening elements may be present.

Present disclosure provides an electronic device with an electromagnet, which includes a housing used for shielding an outside of the electronic device from an electromagnetic field from the charging element. Further, an electronic component could be electrically connected to and mounted on the housing of the electronic device.

Figure 1A:
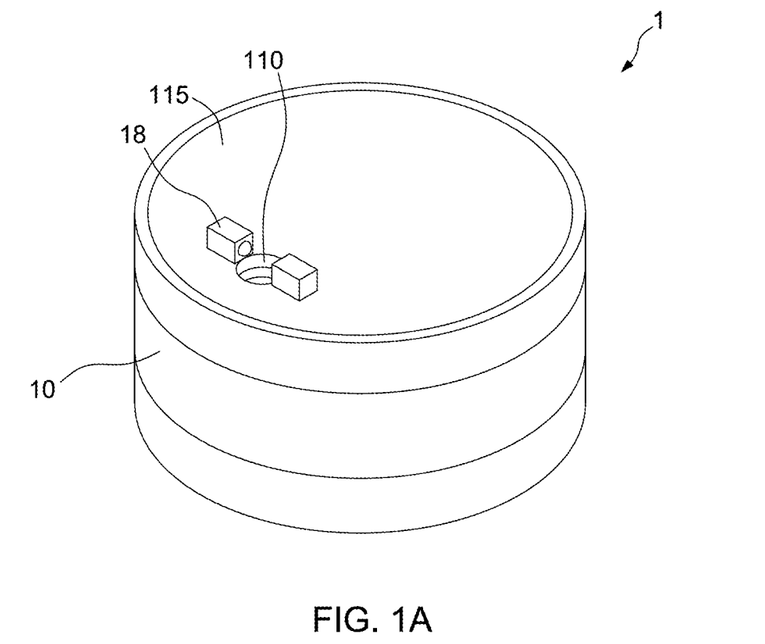
FIG. 1A is a perspective view of an electronic device in accordance with an embodiment of the instant disclosure.
Figure 1B:
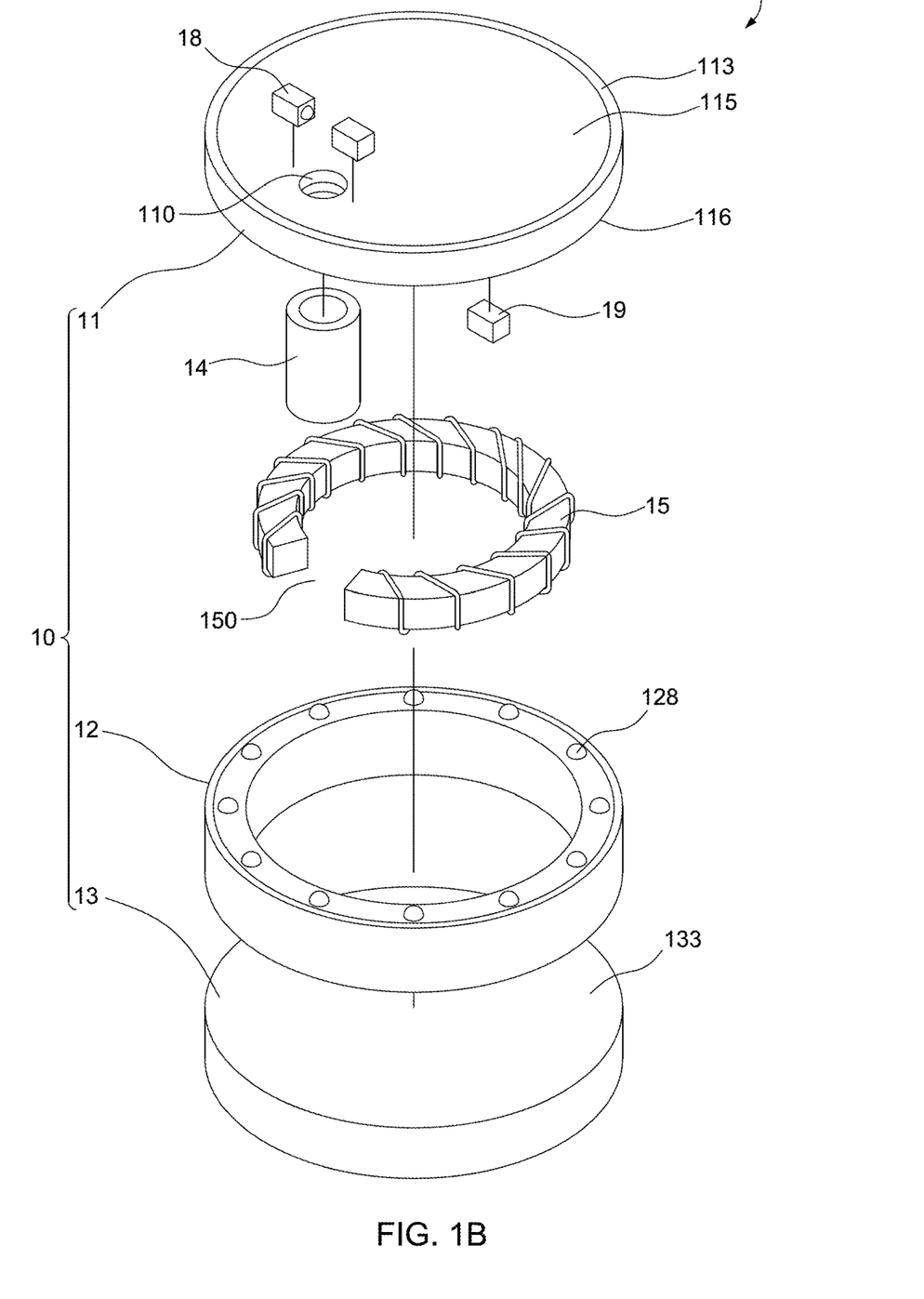
FIG. 1B is an exploded view of an electronic device in accordance with an embodiment of the instant disclosure.
Figure 1C:
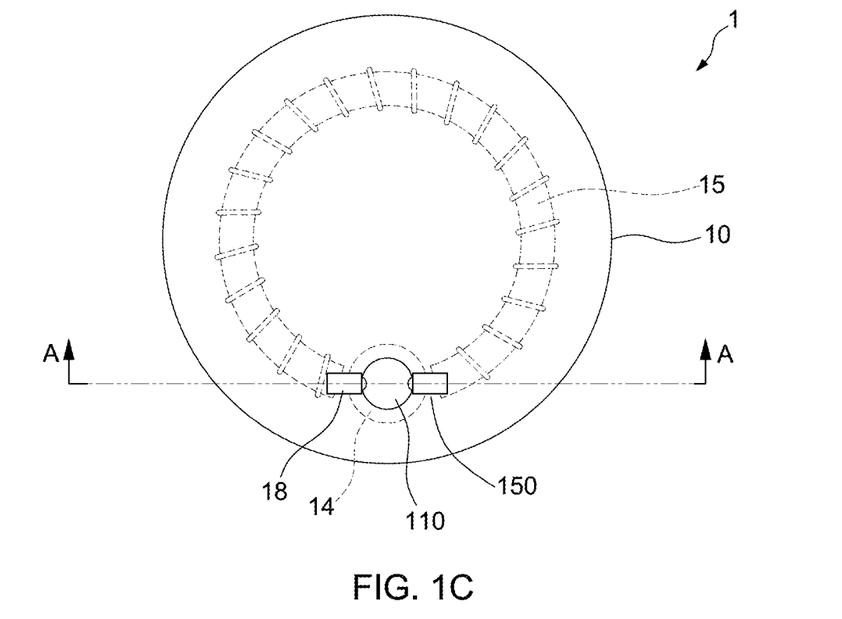
FIG. 1C is a top view of an electronic device in accordance with an embodiment of the instant disclosure.

FIG. 1A is a perspective view of an electronic device 1 in accordance with an embodiment of the instant disclosure. FIG. 1B is an exploded view of an electronic device 1 in accordance with an embodiment of the instant disclosure. FIG. 1C is a top view of an electronic device 1 in accordance with an embodiment of the instant disclosure. Referring to FIGS. 1A, 1B and 1C, the electronic device 1 may include a housing 10. The housing 10 may include a substrate 11 (e.g., an upper substrate), an interposer 12 and a substrate 13 (e.g., a lower substrate). The interposer 12 is stacked on the substrate 13 and the substrate 11 is stacked on the interposer 12. That is, the interposer 12 is disposed on the substrate 13 and supports the substrate 11. When the interposer 12 is stacked on the substrate 13 and the substrate 11 is stacked on the interposer 12, the substrate 11, the interposer 12 and the substrate 13 may cooperatively form the housing 10 for receiving a charging element 15. That is, the charging element 15 may be arranged within a space cooperatively defined by the substrate 11, the interposer 12 and the substrate 13. In some embodiments of the present disclosure, a package body may be arranged within the space cooperatively defined by the substrate 11, the interposer 12 and the substrate 13 and surrounding the charging element 15.

In some embodiments of the present disclosure, the charging element 15 includes an electromagnet. Referring to FIGS. 1B and 1C, the electromagnet may have a ring-shaped body with coils. Further, the ring-shaped body of the charging element 15 may have a gap 150. That is, the charging element 15 includes a breach.

As shown in FIGS. 1B and 1C, a barrier 14 may be arranged in the gap 15 of the charging element 15. The barrier 14 may be arranged within the space cooperatively defined by the substrate 11, the interposer 12 and the substrate 13, together with the charging element 15. In some embodiments of the present disclosure, the barrier 14 may include a closed hollow tube with a circle cross-section or a square cross-section. Thus, when the package body is filled within the space cooperatively defined by the substrate 11, the interposer 12 and the substrate 13 and surrounding the charging element 15, the package body is not into an interior of the barrier 14. Further, the barrier 14 may include a non-ferrous material.

As shown in FIGS. 1A and 1B, the substrate 11 has a surface 113 (e.g., an upper surface) and a surface 116 (e.g., a lower surface) opposite to the surface 113. In some embodiments of the present disclosure, a magnetic material 115 is printed on the surface 113 of the substrate 11. Further, an electronic component 18 may be mounted or disposed on the surface 113 of the substrate 11 and an electronic component 19 may be mounted or disposed on the surface 116 of the substrate 11. In some embodiments of the present disclosure, the electronic component 18 is an IR sensor. In some embodiments of the present disclosure, the electronic component 19 is a temperature sensor.

Further, the substrate 11 may have an opening 110. The opening 110 may substantially align with the barrier 14 and be in communicate with the interior of the barrier 14. That is, the opening 110 and the barrier 14 may cooperatively form a passage extending from outside of the housing 10 into the inside of the housing 10. In some embodiments of the present disclosure, the electronic component 18 mounted on the surface of the substrate 11 is adjacent to the opening 110.

Figure 2:
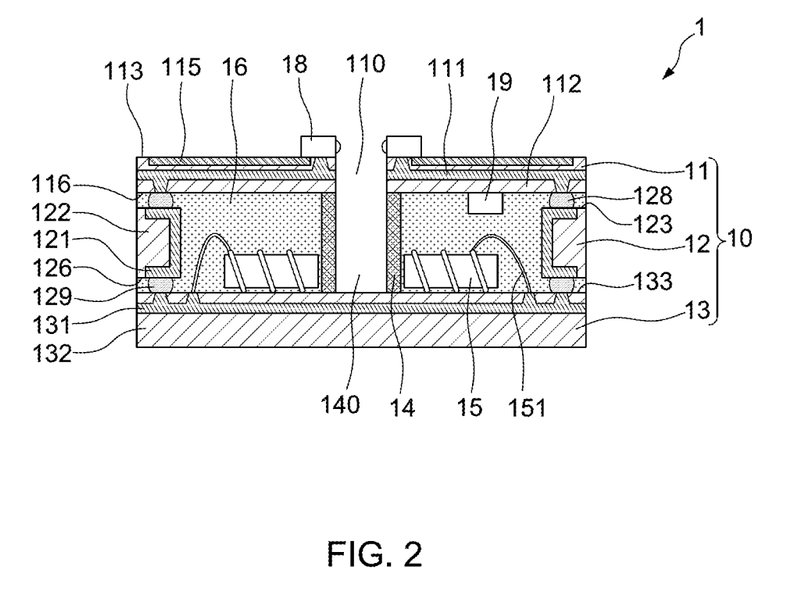
FIG. 2 illustrates a schematic cross-sectional view along line A-A in FIG. 1C.

FIG. 2 illustrates a schematic cross-sectional view along line A-A in FIG. 1C. As shown in FIG. 2, the electronic device 1 may include the housing 10 and the charging element 15 received within the housing 10. The housing 10 may include the substrate 11, the interposer 12 and the substrate 13. The substrate 13 may include a circuit structure. The circuit structure of the substrate 13 may include one or more interconnection layers (e.g., redistribution layer, RDL) 131 and one or more dielectric layers 132. In some embodiments of the present disclosure, the interconnection layers 131 at different layers or levels may be electrically connected to each other through conductive vias (not shown). A portion of the interconnection layers 131 is covered or encapsulated by the corresponding dielectric layers 132 while another portion of the interconnection layers 131 is exposed from the corresponding dielectric layer 132 to provide electrical connections. In some embodiments, the dielectric layers 132 may include an organic material, a solder mask, a polyimide (PI), an epoxy, an Ajinomoto build-up film (ABF), one or more molding compounds, one or more pre-impregnated composite fibers (e.g., a pre-preg fiber), a borophosphosilicate glass (BPSG), a silicon oxide, a silicon nitride, a silicon oxynitride, an undoped silicate glass (USG), any combination thereof, or the like.

The substrate 13 may have a surface 133 (e.g., an upper surface), and the interposer 12 is disposed or mounted on the surface 133 of the substrate 13. The interposer 12 may include a circuit structure. The circuit structure of the interposer 12 may include one or more interconnection layers (e.g., redistribution layer, RDL) 121 and one or more dielectric layers 122. In some embodiments of the present disclosure, the interconnection layers 121 at different layers or levels may be electrically connected to each other through conductive vias (not shown). A portion of the interconnection layers 121 is covered or encapsulated by the corresponding dielectric layers 122 while another portion of the interconnection layers 121 is exposed from the corresponding dielectric layer 122 to provide electrical connections. In some embodiments, the dielectric layers 122 may include an organic material, a solder mask, a polyimide (PI), an epoxy, an Ajinomoto build-up film (ABF), one or more molding compounds, one or more pre-impregnated composite fibers (e.g., a pre-preg fiber), a borophosphosilicate glass (BPSG), a silicon oxide, a silicon nitride, a silicon oxynitride, an undoped silicate glass (USG), any combination thereof, or the like. The interposer 12 includes a surface 123 (e.g., an upper surface) facing away from the substrate 13 and a surface 126 (e.g., a lower surface) facing the substrate 13. In some embodiments of the present disclosure, a plurality of electrical connections 129 is arranged between the surface 133 of the substrate 13 and the surface 126 of the interposer 12 so as to electrically connect the circuit structure of the substrate 13 to the circuit structure of the interposer 12. The electrical connection 129 may include a solder ball or a solder bump such as a C4 bump.

The substrate 11 is disposed or mounted on the surface 123 of the interposer 12. The substrate 11 may include a circuit structure. The circuit structure of the substrate 11 may include one or more interconnection layers (e.g., redistribution layer, RDL) 111 and one or more dielectric layers 112. In some embodiments of the present disclosure, the interconnection layers 111 at different layers or levels may be electrically connected to each other through conductive vias (not shown). A portion of the interconnection layers 111 is covered or encapsulated by the corresponding dielectric layers 112 while another portion of the interconnection layers 111 is exposed from the corresponding dielectric layer 112 to provide electrical connections. In some embodiments, the dielectric layers 112 may include an organic material, a solder mask, a polyimide (PI), an epoxy, an Ajinomoto build-up film (ABF), one or more molding compounds, one or more pre-impregnated composite fibers (e.g., a pre-preg fiber), a borophosphosilicate glass (BPSG), a silicon oxide, a silicon nitride, a silicon oxynitride, an undoped silicate glass (USG), any combination thereof, or the like. The substrate 11 has a surface 116 (e.g., a lower surface) opposite to the surface 113. In some embodiments of the present disclosure, a plurality of electrical connections 128 is arranged between the surface 123 of the interposer 12 and the surface 116 of the substrate 11 so as to electrically connect the circuit structure of the substrate 11 to the circuit structure of the interposer 12. The electrical connection 128 may include a solder ball or a solder bump such as a C4 bump. In addition, the substrate 11 includes the opening 110 extending through the substrate 11.

Further, referring to FIG. 2, the electronic component 18, such as the IR sensor, is disposed or mounted on the surface 113 of the substrate 11. The electronic component 18 may be electrically connected to the circuit structure of the substrate 11. The electronic component 19, such as a temperature sensor 19 is disposed or mounted on the surface 116 of the substrate 11. The electronic component 19 may be electrically connected to the circuit structure of the substrate 11. Moreover, since the circuit structure of the substrate 11 is electrically connected to the circuit structure of the interposer 12 and the circuit structure of the interposer 12 is electrically connected to the circuit structure of the substrate 13, the electronic components 18 and 19 may electrically connected to the circuit structure of the substrate 13 through the circuit structure of the interposer 12.

The charging element 15 is disposed or mounted on the surface 133 of the substrate 13 and received within the interior space of the housing 10. In some embodiments of the present disclosure, the charging element 15 is electrically connected to the circuit structure of the substrate 13. In some embodiments of the present disclosure, the charging element 15 is electrically connected to the circuit structure of the substrate 13 by wires 151. The barrier 14 is disposed on the surface 133 of the substrate 13 and arranged in the gap 150 of the charging element 15 (referring to FIG. 1B). Moreover, the barrier 14 may substantially align with the opening 110 of the substrate 11, and thus the barrier 14 and the opening 110 form a passage 140 communication with the outside of the housing 10. In some embodiments of the present disclosure, the barrier 14 is disposed on the substrate 13 and supports the substrate 11.

An encapsulant 16 (i.e., package body) is disposed on the surface 133 of the substrate 13 and arranged among the substrate 11, the interposer 12 and the substrate 13. That is, the encapsulant 16 may be received within the inner space of the housing 10. The encapsulant 16 may cover the surface 133 of the substrate 13, the interposer 12, the charging element 15, the barrier 14 and the electronic component 19. The encapsulant 16 may include molding compounds, such as a Novolac-based resin, an epoxy-based resin, a silicone-based resin, or other another suitable encapsulant; fillers such as silicon oxide fillers, may be included in the molding compound. In addition, the encapsulant 16 may include a molding underfill (MUF) or a capillary underfill (CUF). As above mentioned, the barrier 14 may include a closed hollow tube. Thus, the barrier 14 is configured to space the passage 140 apart from the encapsulant 16. That is, the encapsulant 16 is blocked to be into the passage 140 by the barrier 14 when the encapsulant 16 is formed in the housing 10. That is, the barrier 14 is configured to separate the encapsulant 16 from the passage 140.

In some embodiments of the present disclosure, the electronic component 18 may be electrically connected to a control unit, and the control unit may be further electrically connected to the charging element 15. Thus, the electronic component 18 may control or drive the charging element 15 through the control unit. When the electronic component 18 detects that an external device, which would be charged by the charging element 15 of the electronic device 1, passes through the opening 110 of the substrate 11 and is put into the passage 140, the electronic component 18 may drive the charging element 15 through the control unit such that the charging element 15 is turned on to electrically couple the external device. When the electronic device detects that the external device is removed from the passage 140, the electronic component 18 may shut down the charging element 15 through the control unit.

When the charging element 15 is turned on to couple the external device, the charging element 15 may produce an electromagnetic field. As above mentioned, the circuit structure of the substrate 11 may include one or more interconnection layers 111, the circuit structure of the interposer 12 may include one or more interconnection layer 121 and the circuit structure of the substrate 13 may include one or more interconnection layers 131, thus the circuit structure of the substrate 11, the circuit structure of the interposer 12 and the circuit structure of the interposer 13 may form a shielding cap which is configured to shield an outside from the electromagnetic field produced by the charging element 15. That is, the housing 10 of the present disclosure may be replaced with the metal cover or the cover with the metal layer of the common charging device. In some embodiments of the present disclosure, the substrate 11 include the magnetic material 115 printed on the surface 113 of the substrate 11. The magnetic material 115 is configured to enhance the shielding ability of the housing 10.

Moreover, the barrier 14 may include a non-ferrous material, so that the electromagnetic field produced by the charging element 15 may penetrate the barrier 14 and the external device received in the passage 140 may electrically couple the charging element 15.

Figure 3A:
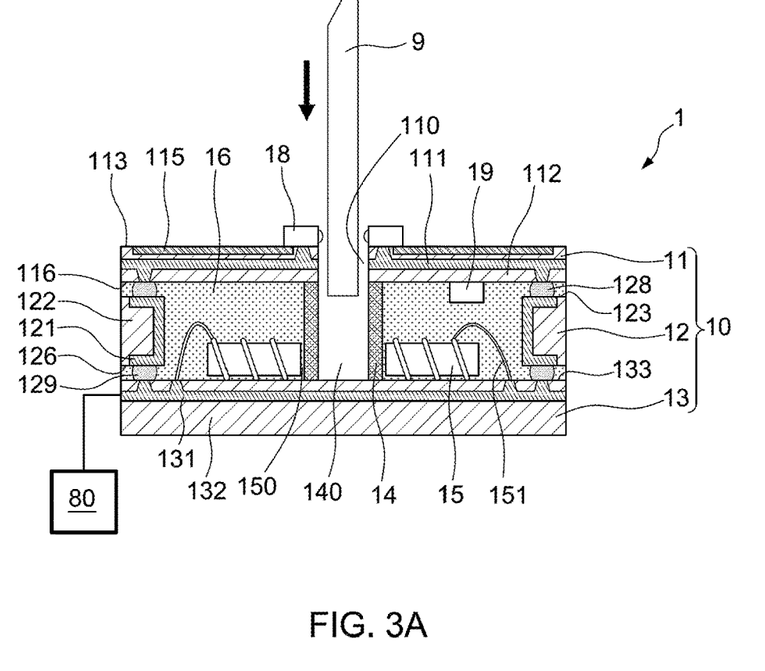
FIG. 3A, FIG. 3B and FIG. 3C illustrate a method of operating an electronic device in accordance with another embodiment of the instant disclosure.
Figure 3B:
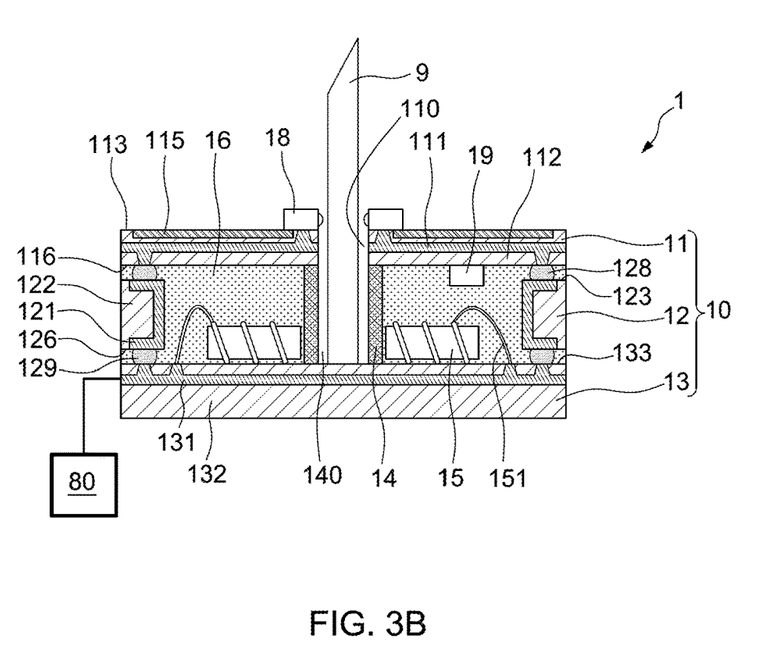
Figure 3C:
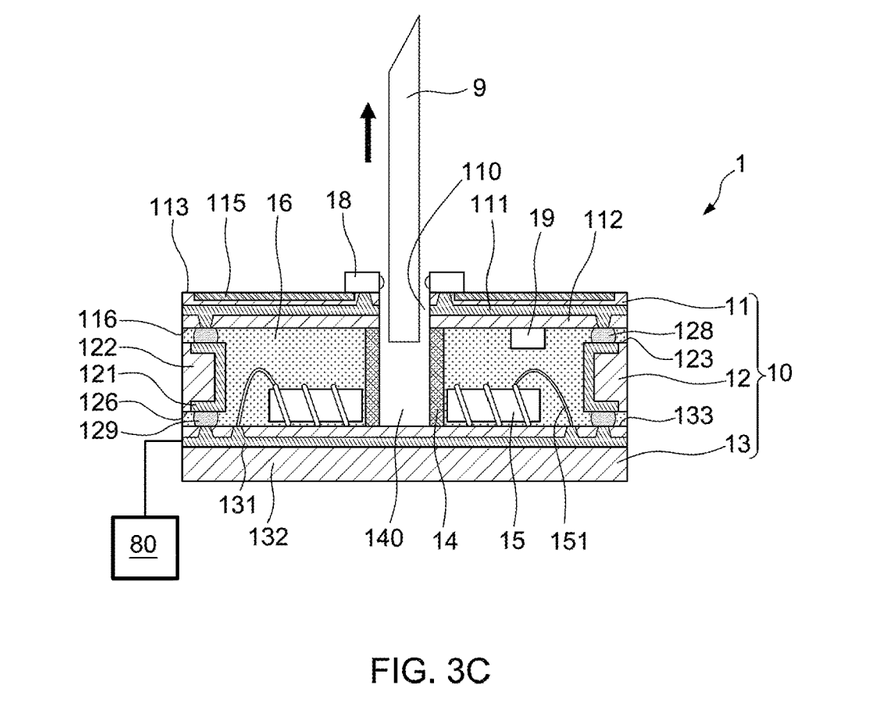

FIG. 3A, FIG. 3B and FIG. 3C illustrate a method of operating the electronic device 1 in accordance with another embodiment of the instant disclosure. Referring to FIGS. 3A, 3B and 3C, the electronic device 1 is electrically connect to a control unit 80. The electronic device 1 is configured to charge an external device 9, such as an earphone, a hearing aid, etc., by the charging element 15. As shown in FIG. 3A, the external device 9 is put into the passage 140 of the electronic device 1 such that the charging element 15 of the electronic device 1 electrically couples the external device 9 and charges the external device 9. When the electronic component 18 detects that the external device 9 passes through the opening 110 of the substrate 11 and into the passage 140, the electronic component 18 may transfer a signal to the control unit 80. Then the control unit 80 may drive a power supply (not shown) to provide current to the charging element 15 such that the charging element 15 is turned on to produce the electromagnetic field.

As shown in FIG. 3B, the external device 9 is passes into the housing 10 of the electronic device 1 and received in the passage 140 of the electronic device 1. The charging element 15 is driven to produce the electromagnetic field and the electromagnetic field penetrates the barrier 14, so that the external device 9 received in the passage 140 is electrically coupled to the charging element 15 and charged by the electronic device 1. Moreover, since the electromagnetic field is strongest at the gap 150 of the charging element 15 and the barrier 14 is arranged in the gap 150 of the charging element 15, the external device 9 is positioned at a location where the electromagnetic field is strongest when the external device 9 is received in the passage 140 and charged by the charging element 15.

After charging the external device 9, the external device 9 is removed from the housing 10 of the electronic device 1 (see FIG. 3C). When the electronic component 18 detects that the external device 9 passes through the opening 110 of the substrate 11 and is removed from the housing 10, the electronic component 18 may transfer a signal to the control unit 80. Then the control unit 80 may shut off the power supply (not shown) so as to turn off the charging unit 15.

FIG. 4A, FIG. 4B, FIG. 4C, FIG. 4D, FIG. 4E and FIG. 4F illustrate one or more stages of an example of a method for manufacturing an electronic device 2 in accordance with some embodiments of the present disclosure.

Figure 4A:
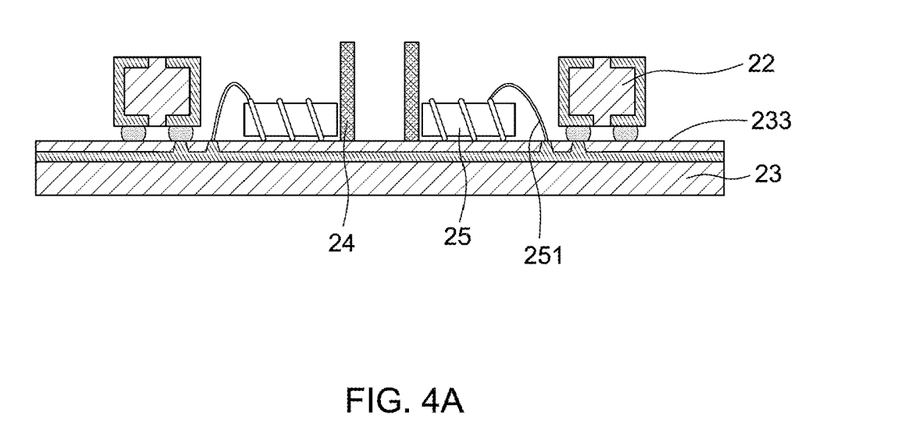
FIG. 4A, FIG. 4B, FIG. 4C, FIG. 4D and FIG. 4E illustrate one or more stages of an example of a method for manufacturing an electronic device in accordance with some embodiments of the present disclosure.

With reference to FIG. 4A, a substrate 23, an interposer 22 and a barrier 24 and a charging element 25 are provided. The substrate 23 may include a circuit structure, and the interposer 22 may include a circuit structure. The interposer 22 is disposed or mounted on a surface 233 of the substrate 23. The circuit structure of the interposer 22 is electrically connected to the circuit structure of the substrate 23. The charging element 25 is disposed or mounted on a surface 233 of the substrate 23. The charging element 25 is electrically connected to the circuit structure of the substrate 23. In some embodiments of the present disclosure, the charging element 5 is electrically connected to the circuit structure of the substrate 23 by wires 251. Further, the charging element 25 includes a ring-shaped body with a gap. The barrier 24 is disposed on the surface 233 of the substrate 23 and arranged within the gap. In some embodiments of the present disclosure, the barrier 24 may include a closed hollow tube.

Figure 4B:
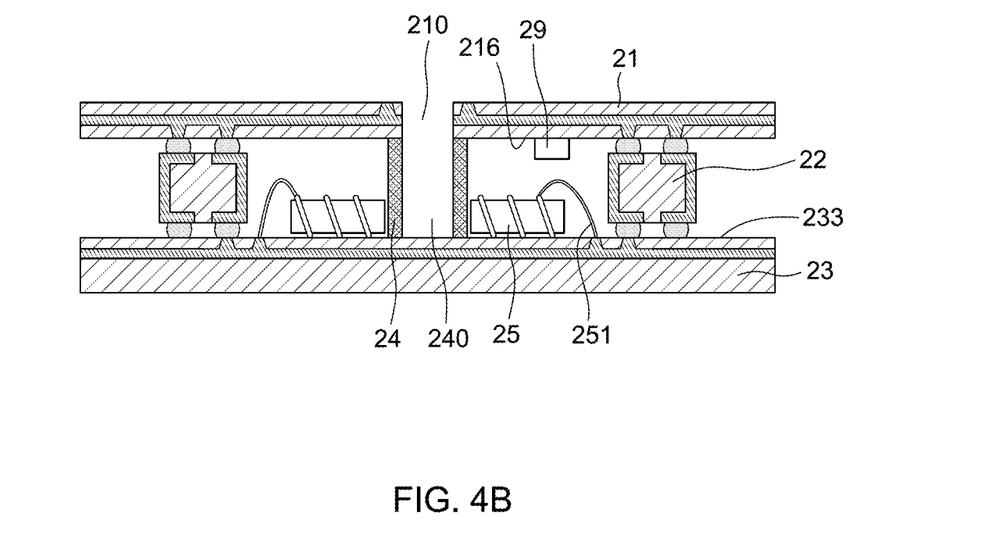

With reference to FIG. 4B, a substrate 21 and an electronic component 29 are provided. The substrate 21 may include a circuit structure. The substrate 21 is disposed or mounted on the interposer 22. The circuit structure of the substrate 21 is electrically connected to the circuit structure of the interposer 22. The substrate 21 has a surface facing the substrate 23, and the electronic component 29 is disposed or mounted on the surface 216 of the substrate 21. The electronic component 29 is electrically connected to the circuit structure of the substrate 21. In some embodiments of the present disclosure, the electronic component 29 includes a temperature sensor. In addition, the substrate 21 includes an opening 210 extending through the substrate 21. The opening 210 of the substrate 21 substantially aligns with the barrier 24 and thus form a passage 240.

Figure 4C:
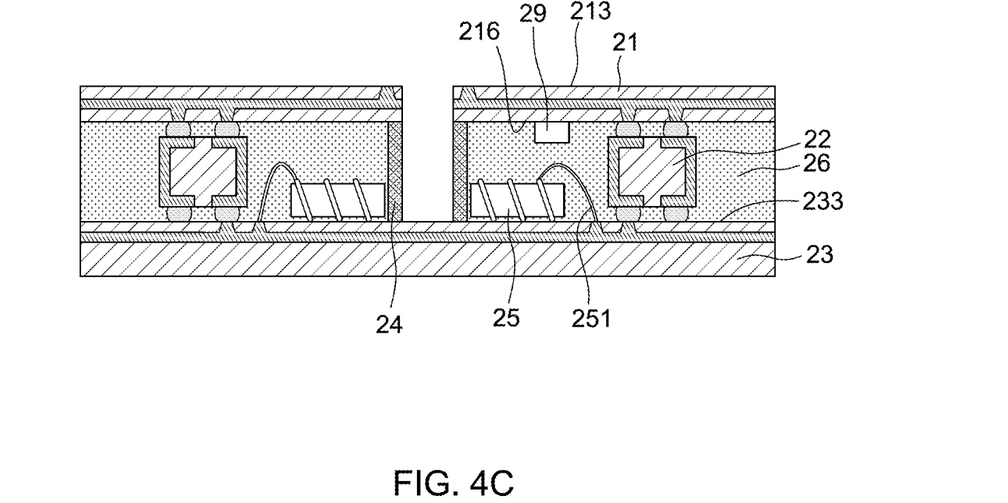

With reference to FIG. 4C, an encapsulant 26 is provided. In some embodiments of the present disclosure, the encapsulant 26 is provided by an exposed molding operation. The encapsulant 26 is arranged on the surface 233 of the substrate 23 and covers the substrates 21 and 23, the interposer 22, the barrier 24, the charging element 25 and the electronic component 29. Further, the barrier 24 blocks the encapsulant 26 to be into the interior space of the barrier 24. Thus, there is no encapsulant 26 in the passage 240. Therefore, the barrier 24 is configured to space the passage 240 apart from the encapsulant 26.

Figure 4D:
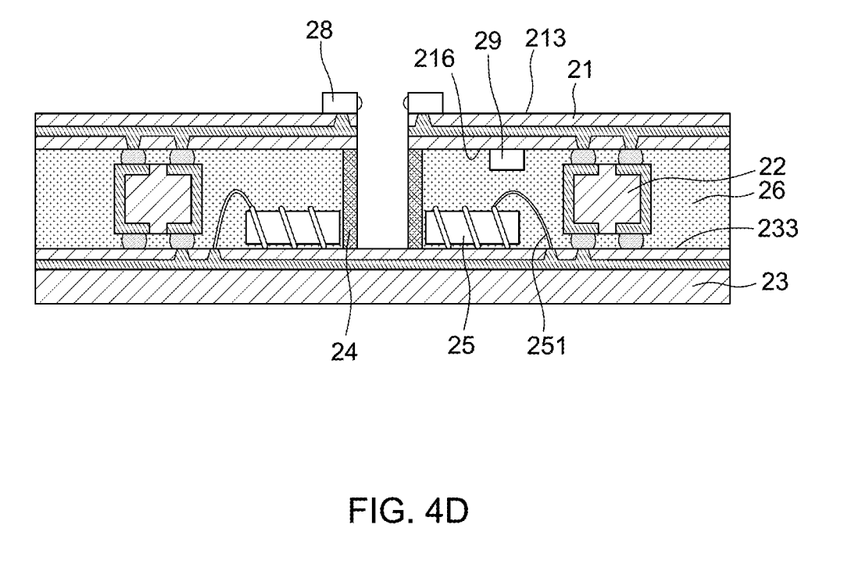

With reference to FIG. 4D, electronic components 28 are provided. The electronic components are disposed on a surface 213 of the substrate 21, which faces away from the substrate 23 and is not covered by the encapsulant 26. As shown in FIG. 4D, the electronic components 28 are arranged to be adjacent to the opening 210 of the substrate 21. The electronic component 28 are electrically connected to the circuit structure of the substrate 21. In some embodiments of the present disclosure, the electronic component 28 includes an IR sensor.

Figure 4E:
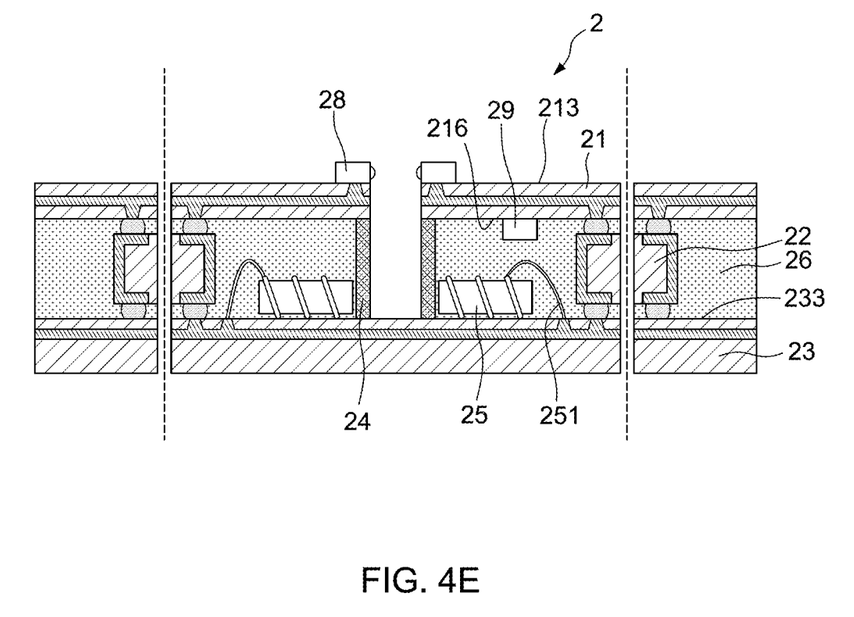

Referring to FIG. 4E, a singulation operation may be performed on the substrate 21, the interposer 22, the substrate 23 and the encapsulant 26. The electronic device 2 is formed, and the substrate 21, the interposer 22 and the substrate 23 cooperatively form a housing of the electronic device 2, which is configured to receive the charging element 25 and shield an outside of the housing from an electromagnetic field from the charging element 25.

After the manufacturing process as shown in FIG. 4A, FIG. 4B, FIG. 4C, FIG. 4D, FIG. 4E, the electronic device 2 is formed (see FIG. 4E). In some embodiments of the present disclosure, the electronic device 2 is the same as, or similar to, the electronic device 1 shown in FIG. 1A, FIG. 1B, FIG. 1C and FIG. 2.

Figure 5A:
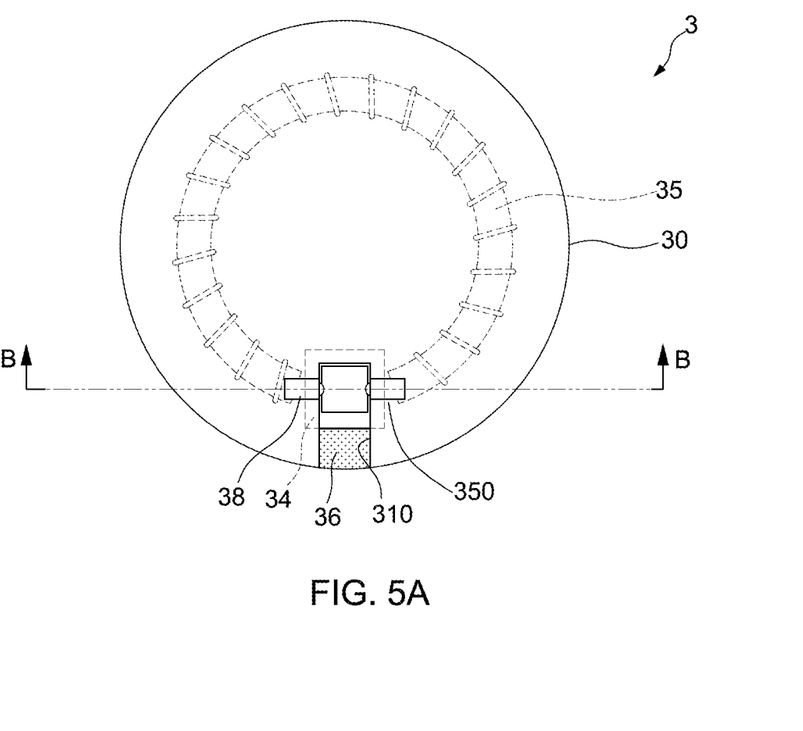
FIG. 5A is a top view of an electronic device in accordance with an embodiment of the instant disclosure.
Figure 5B:
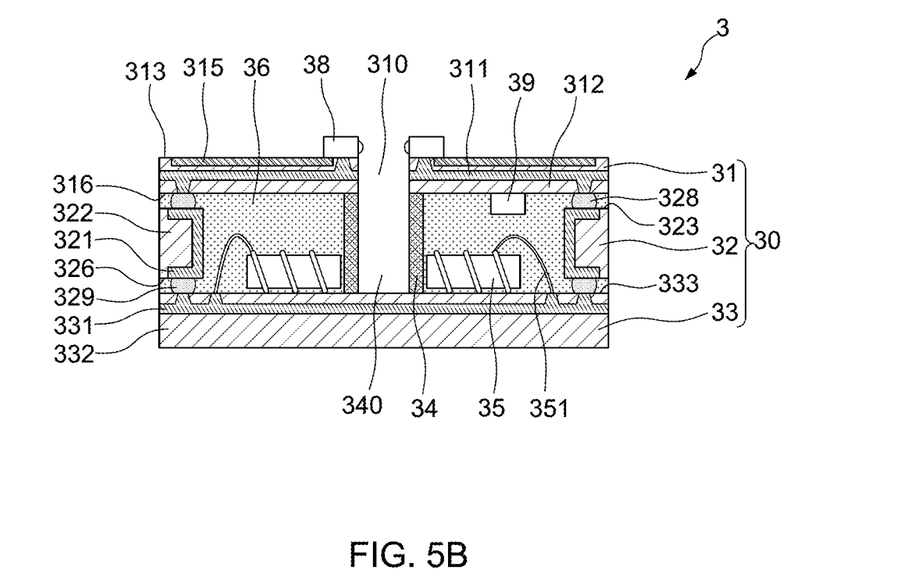
FIG. 5B illustrates a schematic cross-sectional view along line B-B in FIG. 5A.

FIG. 5A is a top view of an electronic device 3 in accordance with an embodiment of the instant disclosure. FIG. 5B illustrates a schematic cross-sectional view along line B-B in FIG. 5A.

As shown in FIG. 5A and FIG. 5B, the electronic device 3 may include a housing 30 and a charging element 35 received within the housing 30. The housing 30 may include a substrate 31, an interposer 32 and a substrate 33. Referring to FIG. 5B, the substrate 33 may include a circuit structure. The circuit structure of the substrate 33 may include one or more interconnection layers (e.g., redistribution layer, RDL) 331 and one or more dielectric layers 332. In some embodiments of the present disclosure, the interconnection layers 331 at different layers or levels may be electrically connected to each other through conductive vias (not shown). A portion of the interconnection layers 331 is covered or encapsulated by the corresponding dielectric layers 332 while another portion of the interconnection layers 331 is exposed from the corresponding dielectric layer 332 to provide electrical connections. In some embodiments, the dielectric layers 332 may include an organic material, a solder mask, a polyimide (PI), an epoxy, an Ajinomoto build-up film (ABF), one or more molding compounds, one or more pre-impregnated composite fibers (e.g., a pre-preg fiber), a borophosphosilicate glass (BPSG), a silicon oxide, a silicon nitride, a silicon oxynitride, an undoped silicate glass (USG), any combination thereof, or the like.

The substrate 33 may have a surface 333 (e.g., an upper surface), and the interposer 32 is disposed or mounted on the surface 333 of the substrate 33. The interposer 32 may include a circuit structure. The circuit structure of the interposer 32 may include one or more interconnection layers (e.g., redistribution layer, RDL) 321 and one or more dielectric layers 322. In some embodiments of the present disclosure, the interconnection layers 321 at different layers or levels may be electrically connected to each other through conductive vias (not shown). A portion of the interconnection layers 321 is covered or encapsulated by the corresponding dielectric layers 322 while another portion of the interconnection layers 321 is exposed from the corresponding dielectric layer 322 to provide electrical connections. In some embodiments, the dielectric layers 322 may include an organic material, a solder mask, a polyimide (PI), an epoxy, an Ajinomoto build-up film (ABF), one or more molding compounds, one or more pre-impregnated composite fibers (e.g., a pre-preg fiber), a borophosphosilicate glass (BPSG), a silicon oxide, a silicon nitride, a silicon oxynitride, an undoped silicate glass (USG), any combination thereof, or the like. The interposer 32 includes a surface 323 (e.g., an upper surface) facing away from the substrate 33 and a surface 326 (e.g., a lower surface) facing the substrate 33. In some embodiments of the present disclosure, a plurality of electrical connections 329 is arranged between the surface 333 of the substrate 33 and the surface 326 of the interposer 32 so as to electrically connect the circuit structure of the substrate 33 to the circuit structure of the interposer 32. The electrical connection 329 may include a solder ball or a solder bump such as a C4 bump.

The substrate 31 is disposed or mounted on the surface 323 of the interposer 32. The substrate 31 may include a circuit structure. The circuit structure of the substrate 31 may include one or more interconnection layers (e.g., redistribution layer, RDL) 311 and one or more dielectric layers 312. In some embodiments of the present disclosure, the interconnection layers 311 at different layers or levels may be electrically connected to each other through conductive vias (not shown). A portion of the interconnection layers 311 is covered or encapsulated by the corresponding dielectric layers 312 while another portion of the interconnection layers 311 is exposed from the corresponding dielectric layer 312 to provide electrical connections. In some embodiments, the dielectric layers 312 may include an organic material, a solder mask, a polyimide (PI), an epoxy, an Ajinomoto build-up film (ABF), one or more molding compounds, one or more pre-impregnated composite fibers (e.g., a pre-preg fiber), a borophosphosilicate glass (BPSG), a silicon oxide, a silicon nitride, a silicon oxynitride, an undoped silicate glass (USG), any combination thereof, or the like. The substrate 31 has a surface 313 (e.g., an upper surface) and a surface 316 (e.g., a lower surface) opposite to the surface 313. In some embodiments of the present disclosure, a plurality of electrical connections 328 is arranged between the surface 323 of the interposer 32 and the surface 316 of the substrate 31 so as to electrically connect the circuit structure of the substrate 31 to the circuit structure of the interposer 32. The electrical connection 328 may include a solder ball or a solder bump such as a C4 bump.

Moreover, the substrate 31 includes the opening 310 extending through the substrate 31. Referring to FIG. 5A, the opening 310 may extend to a periphery 301 of the housing 30. That is, the opening 310 may be a gap formed at a side edge of the substrate 31.

Further, referring to FIG. 5A, and FIG. 5B an electronic component 38, such as the IR sensor, is disposed or mounted on the surface 313 of the substrate 31. The electronic component 38 may be electrically connected to the circuit structure of the substrate 31. An electronic component 39, such as a temperature sensor 39 is disposed or mounted on the surface 316 of the substrate 31. The electronic component 39 may be electrically connected to the circuit structure of the substrate 31. Moreover, since the circuit structure of the substrate 31 is electrically connected to the circuit structure of the interposer 32 and the circuit structure of the interposer 32 is electrically connected to the circuit structure of the substrate 33, the electronic components 38 and 39 may electrically connected to the circuit structure of the substrate 33 through the circuit structure of the interposer 32.

Referring to FIG. 5A, a charging element 35 includes a ring-shaped body with a gap 150. Referring to FIG. 5B, the charging element 35 is disposed or mounted on the surface 333 of the substrate 33 and received within the interior space of the housing 30. In some embodiments of the present disclosure, the charging element 35 is electrically connected to the circuit structure of the substrate 33. In some embodiments of the present disclosure, the charging element 35 is electrically connected to the circuit structure of the substrate 33 by wires 351.

As shown in FIG. 5B, a barrier 34 is disposed on the surface 333 of the substrate. In some embodiments of the present disclosure, the barrier 34 is disposed on the substrate 33 and supports the substrate 31. The barrier 34 may include a closed hollow tube. Referring to FIG. 5A, the barrier 34 has a square cross-section and arranged in the gap 350 of the charging element 35. Moreover, the barrier 34 may substantially align with the opening 310 of the substrate 31, and thus the barrier 34 and the opening 310 form a passage 340 communication with the outside of the housing 30 (see FIG. 5B).

As shown in FIG. 5B, an encapsulant 36 (i.e., package body) is disposed on the surface 333 of the substrate 33 and arranged among the substrate 31, the interposer 32 and the substrate 33. That is, the encapsulant 36 may be received within the inner space of the housing 30. The encapsulant 36 may cover the surface 333 of the substrate 33, the interposer 32, the charging element 35, the barrier 34 and the electronic component 39. The encapsulant 36 may include molding compounds, such as a Novolac-based resin, an epoxy-based resin, a silicone-based resin, or other another suitable encapsulant; fillers such as silicon oxide fillers, may be included in the molding compound. In addition, the encapsulant 36 may include a molding underfill (MUF) or a capillary underfill (CUF). As above mentioned, the barrier 34 may include a closed hollow tube. Thus, the barrier 34 is configured to space the passage 340 apart from the encapsulant 36. That is, the encapsulant 36 is blocked to be into the passage 340 by the barrier 34 when the encapsulant 36 is formed in the housing 30. Moreover, referring to FIG. 5A, since the opening 301 extends to the periphery 301 of the housing 30, a portion of the encapsulant 36 is exposed through the opening 310.

In some embodiments of the present disclosure, the electronic component 38 may be electrically connected to a control unit, and the control unit may be further electrically connected to the charging element 35. Thus, the electronic component 38 may control or drive the charging element 35 through the control unit. When the electronic component 38 detects that an external device, which would be charged by the charging element 35 of the electronic device 3, passes through the opening 310 of the substrate 31 and is put into the passage 340, the electronic component 38 may drive the charging element 35 through the control unit such that the charging element 35 is turned on to electrically couple the external device. When the electronic device detects that the external device is removed from the passage 340, the electronic component 38 may shut down the charging element 35 through the control unit.

When the charging element 35 is turned on so as to couple the external device, the charging element 35 may produce an electromagnetic field. As above mentioned, the circuit structure of the substrate 31 may include one or more interconnection layers 311, the circuit structure of the interposer 32 may include one or more interconnection layer 321 and the circuit structure of the substrate 33 may include one or more interconnection layers 331, thus the circuit structure of the substrate 31, the circuit structure of the interposer 32 and the circuit structure of the interposer 33 may form a shielding cap which is configured to shield an outside from the electromagnetic field produced by the charging element 35. That is, the housing 30 of the present disclosure may be replaced with the metal cover or the cover with the metal layer of the common charging device. In some embodiments of the present disclosure, the substrate 31 include the magnetic material 315 printed on the surface 313 of the substrate 31. The magnetic material 315 is configured to enhance the shielding ability of the housing 30.

Moreover, the barrier 34 may include a non-ferrous material, so that the electromagnetic field produced by the charging element 35 may penetrate the barrier 34 and the external device received in the passage 340 may electrically couple the charging element 35.

As used herein, the singular terms "a," "an," and "the" may include a plurality of referents unless the context clearly dictates otherwise.

As used herein, the terms "approximately," "substantially," "substantial" and "about" are used to describe and account for small variations. When used in conjunction with an event or circumstance, the terms can refer to instances in which the event or circumstance occurs precisely as well as instances in which the event or circumstance occurs to a close approximation. For example, when used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, two numerical values can be deemed to be "substantially" the same or equal if the difference between the values is less than or equal to ±10% of an average of the values, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" parallel can refer to a range of angular variation relative to 0° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°. For example, "substantially" perpendicular can refer to a range of angular variation relative to 90° that is less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range were explicitly specified.

While the present disclosure has been described and illustrated with reference to specific embodiments thereof, these descriptions and illustrations do not limit the present disclosure. It should be understood by those skilled in the art that various changes may be made and equivalents may be substituted without departing from the true spirit and scope of the present disclosure as defined by the appended claims. The illustrations may not be necessarily drawn to scale. There may be distinctions between the artistic renditions in the present disclosure and the actual apparatus due to manufacturing processes and tolerances. There may be other embodiments of the present disclosure which are not specifically illustrated. The specification and drawings are to be regarded as illustrative rather than restrictive. Modifications may be made to adapt a particular situation, material, composition of matter, method, or process to the objective, spirit and scope of the present disclosure. All such modifications are intended to be within the scope of the claims appended hereto. While the methods disclosed herein are described with reference to particular operations performed in a particular order, it will be understood that these operations may be combined, sub-divided, or re-ordered to form an equivalent method without departing from the teachings of the present disclosure. Accordingly, unless specifically indicated herein, the order and grouping of the operations are not limitations on the present disclosure.

What is claimed is:

1. An electronic device, comprising:
  a charging element;
  a housing covering the charging element; and
  a first sensing element electrically connected to the housing and configured to detect an external device to enable the charging element;
  wherein the housing comprises an upper substrate, an intermediate substrate, and a lower substrate, which are stacked and spaced apart from each other;
  wherein the charging element is positioned external to and spaced apart from the intermediate substrate;
  wherein the charging element is electrically connected to the lower substrate through a wire, and wherein an end of the wire is connected to an upper surface of the lower substrate, the upper surface of the lower substrate facing the upper substrate.

2. The electronic device of claim 1, wherein the upper substrate, an inner sidewall of the intermediate substrate, and the lower substrate collectively define a space configured to accommodate the charging element, wherein the inner sidewall of the intermediate substantially surrounds the charging element.

3. The electronic device of claim 1, wherein, in a cross-sectional view, a portion of the wire horizontally overlaps the intermediate substrate and charging element.

4. The electronic device of claim 1, wherein the intermediate substrate has an upper surface, a side surface, a lower surface and an interconnection layer continuously extending across the upper surface, the side surface, and the lower surface, and wherein the upper surface of the intermediate substrate faces the upper substrate, the side surface of the intermediate substrate faces the charging element, the lower surface of the intermediate substrate faces the lower substrate.

5. An electronic device, comprising:
  a charging element;
  a housing comprising a circuit structure including an opening; and
  a first sensing element adjacent to the housing;
  wherein the charging element is electrically connected to the first sensing element through the circuit structure of the housing;
  wherein the first sensing element is configured to detect an external device passing through the opening in a direction substantially orthogonal to a detecting direction defined by the first sensing element;
  wherein the first sensing element is positioned over the housing and adjacent to the opening, and wherein, from a top view perspective, the first sensing element at least partially overlaps the charging element;
  wherein the first sensing element directly contacts an upper surface of the circuit structure, the upper surface of the circuit structure facing away from the charging element;

wherein the circuit structure comprises a magnetic material, an interconnection layer and a dielectric layer, and wherein the first sensing element contacts the magnetic material, the interconnection layer and the dielectric layer.

6. The electronic device of claim 5, wherein an upper surface of the magnetic material, an upper surface of the interconnection layer, and an upper surface of the dielectric layer are substantially coplanar with each other, the upper surface of the magnetic material, the upper surface of the interconnection layer and the upper surface of the dielectric layer faces away from the charging element.

7. The electronic device of claim 5, further comprising a second sensing element, wherein the second sensing element directly contacts the upper surface of the circuit structure and is positioned opposite the first sensing element.

* * * * *